Dec. 22, 1925.
S. GADE
1,566,273
BATH FIXTURE
Filed Sept. 2, 1925
2 Sheets-Sheet 1
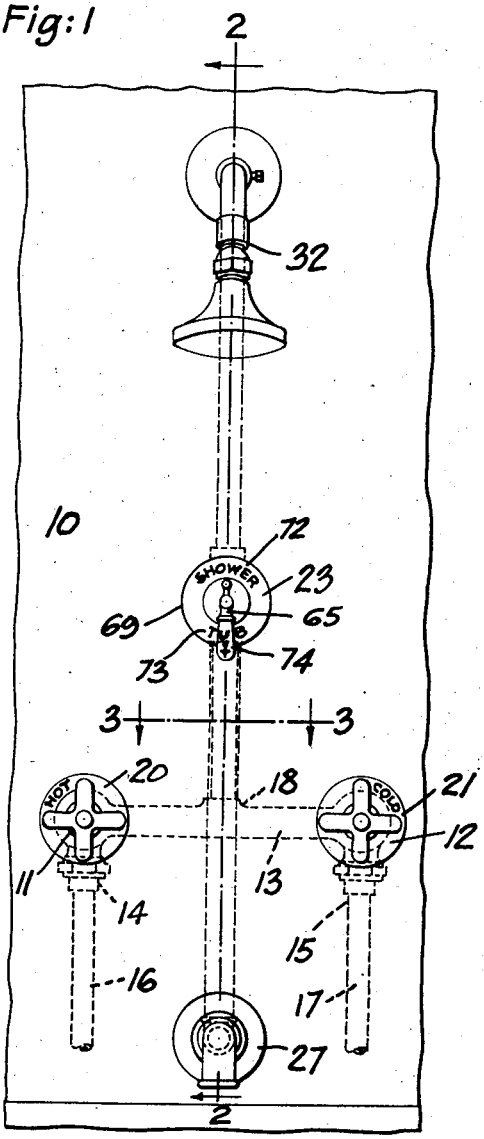
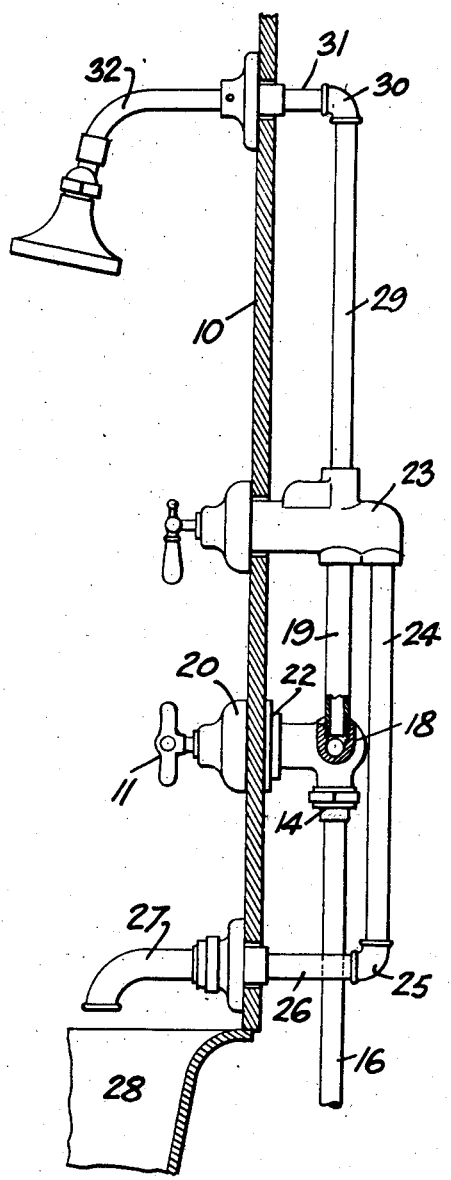
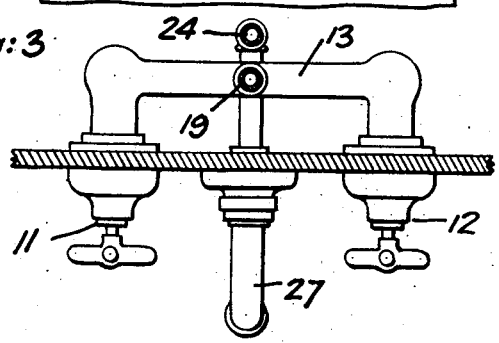
SAMUEL GADE
INVENTOR
BY Walter E. Wollheim
ATTORNEY Dec. 22, 1925.
S. GADE
1,566,273
BATH FIXTURE
Filed Sept. 2, 1925   2 Sheets-Sheet 2
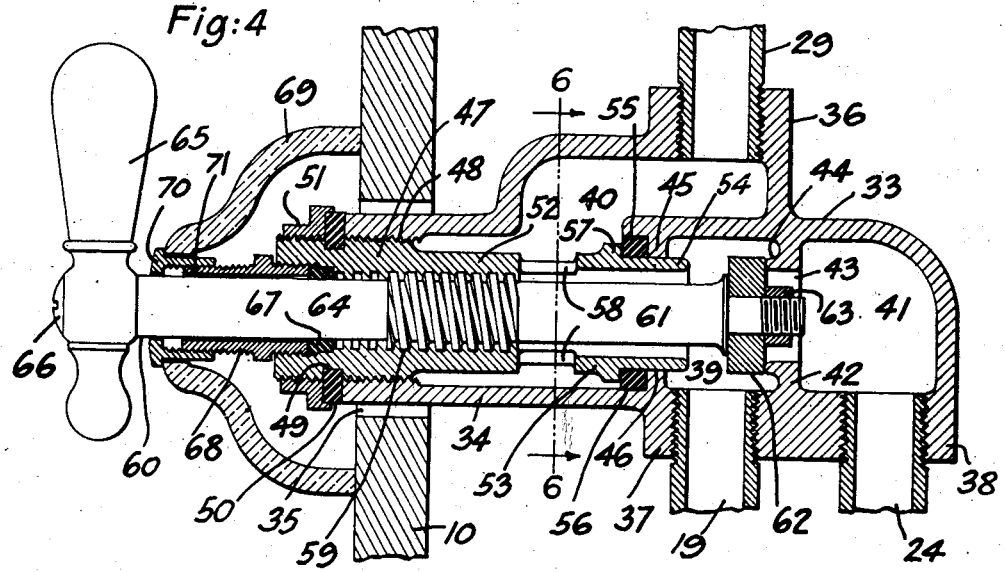
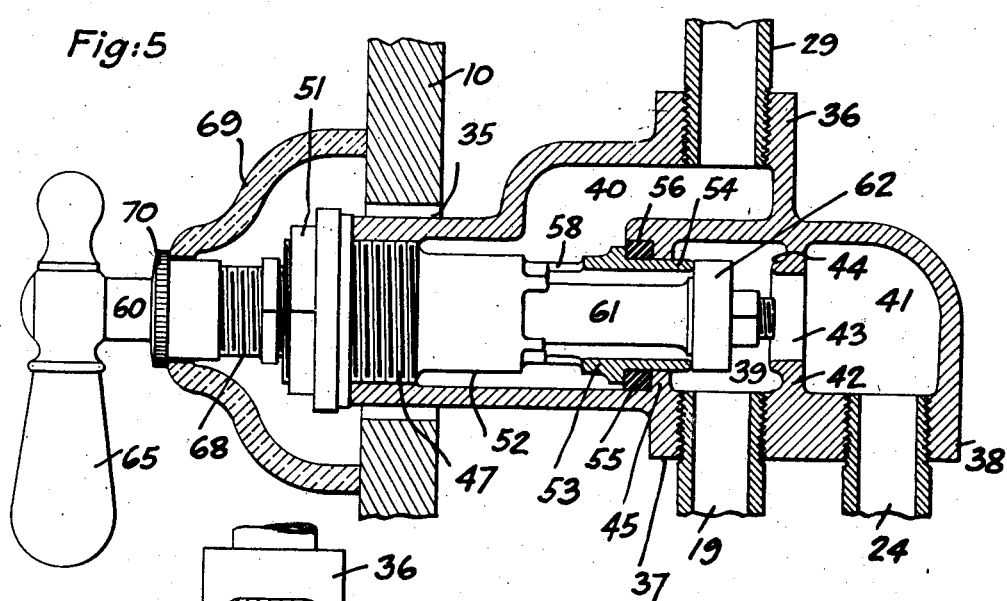
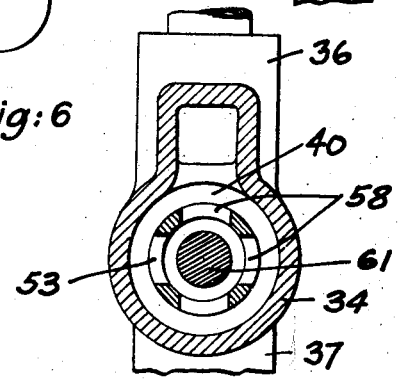
SAMUEL GADE
INVENTOR
BY Walter E. Wollheim
ATTORNEY Patented Dec. 22, 1925.

1,566,273

UNITED STATES PATENT OFFICE.

SAMUEL GADE, OF NEW YORK, N. Y.

BATH FIXTURE.

Application filed September 2, 1925. Serial No. 54,069.

*To all whom it may concern:*

Be it known that I, SAMUEL GADE, a citizen of the United States, and a resident of New York, in the county of New York and State of New York, have invented certain new and useful Improvements in Bath Fixtures, of which the following is a specification.

This invention relates to improvements in bath fixtures and more particularly to valve control means for the hot and cold water supply to bath tubs and showers.

Heretofore in bath fixtures a set of two valves was usually employed for admitting and regulating the flow of hot and cold water to the tub and another set of two valves for similarly admitting and regulating the water supply to the shower. These valves were either assembled independently or constructed so that each set of two valves was located in one housing, or one housing was sometimes provided with four independent valves for the same purpose. Or else, in place of the two valves for regulating the water to the shower, a single mixing valve was employed for regulating the temperature of the water.

In all of these constructions, certain failures often occurred and objectionable features were present. In the case of four independent valves the desired temperature of the water for the shower could only be ascertained by the water issuing therefrom, under accompanying annoying splashing, until properly adjusted. This also happened when the mixing valve was used, unless this valve was regulated before the water was admitted through its supply control valves; in the latter case, when, as often occurring, the regulation was incorrect, the user was scalded by water of too high a temperature. Furthermore, with a construction employing a mixing valve, the user often forgot to shut off the individual hot and cold water supply valves, in which case the water had an opportunity to circulate from the hot water pipe into the cold water pipe, or vice versa, according to which pressure was the highest, or the slight corrosion, incidental to this valve being under water pressure, caused it to stick and resulted in the breaking of its handle or other serious damage when again intended to be operated.

When four independent valves were used, one for the tub, one for the shower, and the other two for the hot and cold water supply pipes, it often occurred that the supply valves were left open, the user not noticing it because no water issued to the tub or from the shower. In such case too the hot water could circulate into the cold water pipe, or vice versa.

It is the principal object of this invention to overcome the difficulties in operation of the bath fixtures and their failures, as explained hereinbefore, and with this purpose in view, I provide in such fixtures primary valves for the admission and control of cold and hot water and a single secondary valve by means of which the water mixture, as regulated by the primary valves, can be diverted to either the tub or the shower, as desired.

Another object is to provide for the water to the shower a tell-tale or test flow through the spout discharging water into the tub, whereby splashing of the water is prevented and where, by a single movement of the secondary valve, this flow of water, properly adjusted as to temperature, will be diverted to the shower.

A further object is to so construct the secondary valve that water always issues from either the spout to the tub or from the shower so that the user must close the primary valves to shut off the water, whereby the backing of hot water into cold water pipes, or vice versa, is positively eliminated, and a much longer life to the valves insured.

A still further object is to provide the secondary valve with simple means indicative of the direction of the flow of water, whether to the tub or the shower.

Still another object is to reduce the cost of manufacturing bath fixtures of this kind to a minimum, by the elimination of expensive mixing valves, or independent operating valves for the water supply to both the tub and the shower, and to cut down as much as possible the time consumed to install such valves in their proper positions.

Still further objects and advantages of the invention will become apparent in the following specifications and the accompanying drawings, in which—

Fig. 1 is an elevational view showing a set of bath fixtures comprising a hot water and a cold water supply control valve, or so-called primary valves, a shower head, a water outlet spout for a bath tub, and a water diverting valve or so-called secondary valve;

Fig. 2 is a partial side view and section substantially along the plane of line 2—2 in Fig. 1;

Fig. 3 is a cross sectional view along the plane of line 3—3 in Fig. 1;

Fig. 4 is a longitudinal sectional view through the secondary valve in a position of diverting water to the shower head;

Fig. 5 is a similar view, but in a position of diverting water to the spout discharging water into the tub; and Fig. 6 is a cross sectional view along the plane of line 6—6 in Fig. 4.

Like characters of reference denote similar parts throughout the several views and the following specification.

10 is a wall in a bath room to which is secured a hot water supply control valve 11 and a cold water supply control valve 12. These valves, already referred to as primary valves, have a common housing 13 concealed behind the wall 10, and union connections 14 and 15 to connect with, respectively, a hot water supply pipe 16 and a cold water supply pipe 17. In, preferably, the center of the housing, pointing upwardly, is an outlet connection 18 to which is connected a water mixture pipe 19. Valves 11 and 12 and thereby housing 13 are secured to the wall by means of the usual escutcheons 20 and 21, marked, respectively, "Hot" and "Cold," and lock nuts 22 in the customary manner.

23 is a water diverting valve or secondary valve, having secured to its lower side the water mixture pipe 19. Attached also to the lower side of the water diverting valve 23 is a pipe 24 which by means of an elbow 25 and nipple 26 is connected to a water spout 27 adapted to discharge water into a bath tub 28 of which a fragmentary section is shown in Fig. 2. Pipe 24 is hereinafter referred to as tub pipe. The upper end of the diverting valve 23 has connected thereto a pipe 29 which by means of an elbow 30 and nipple 31 is connected to a shower head 32, suitably secured to the wall 10. Pipe 29 will be called hereafter shower pipe.

I shall now explain more in detail the construction of the diverting or secondary valve 23:

33 is a housing having a substantially cylindrical form 34 which partly projects into the room through an opening 35 in the wall 10. At the top of the housing is a cylindrical branch 36, tapped out to receive the shower pipe 29. At the bottom is provided a similar branch 37, preferably in central alignment with branch 36, threaded interiorly for the water mixture pipe 19. Tub pipe 24 is similarly connected to the bottom of the housing at 38, ahead of branch 37. The interior of the housing 33 is divided into three distinct chambers, viz. a control or inlet chamber 39, a shower outlet chamber 40, and a tub outlet chamber 41. 42 is a wall separating chambers 39 and 41, positioned between connections 37 and 38 at the bottom of the housing. 43 is a port opening through the wall 42 surrounded in the chamber 39 with an annular raised valve seat 44. 45 is a wall dividing chambers 39 and 40 provided with a circular opening 46 for the purpose set forth hereinafter. Walls 42 and 45 are located at both sides of the outlet of pipe 19, and openings 43 and 46 are in central alignment with each other. The end of housing 33 which extends beyond the wall 10 is threaded interiorly in alignment with openings 43 and 46 to receive a bonnet 47 which is correspondingly threaded at 48. 49 is a recess around the outside of the threaded part of the bonnet adjacent the end of the housing 33 for the purpose of receiving an annular rubber gasket 50 which is pressed against the forward wall of the recess 49 and the face of housing 33 by means of a lock nut 51 to make a tight joint between the outside of the bonnet and the housing to prevent leakage therethrough. The forward part of the bonnet 47 which projects into the housing 33 is of a somewhat smaller diameter than 48, at 52, and terminates in a tubular end 53 which projects through opening 46 into the chamber 39, forming an annular valve seat 54 therein opposite to and of, preferably, the same size as seat 44. The other side of wall 45 is bored out at 55 to receive an annular rubber gasket 56 which is pressed against the wall by an annular shoulder 57 at the outside of the tubular end 53 of the bonnet, preventing leakage around its outside through the opening 46 of the chamber 39. 58 are openings through the walls of the tubular end 53 affording means of communication between chambers 39 and 40. Bonnet 47 is threaded interiorly at 59 to receive a valve spindle 60. A reduced diameter 61 of spindle 60 projects through tubular end 53 of the bonnet 47 into the chamber 39. A two-faced valve disc 62 is mounted upon the end of spindle 60 by means of a lock nut 63. The disc 62 is of such proportions as to seat at either of the valve seats 44 or 54 within the chamber 39. The other end of the valve spindle 60 which extends outwardly of the wall 10 is also of a reduced diameter at 64 and provided with a handle 65 fastened thereto by means of a screw 66. 67 is an annular gasket at the rearward end of the thread in the bonnet 47 for the spindle 60 which is compressed by a gland 68 screwed into the rear end of the bonnet to prevent leakage around the thread of the valve spindle. 69 is an escutcheon or shield to cover the inwardly projecting parts of the valve bonnet 47 with its lock nut, gland, etc., which is held against the wall 10 by means of a lock nut 70 in threaded engagement at 71 with the gland 68. As shown in Fig. 1, escutcheon 69 is marked at 72 "Shower" and diametrically opposite at 73 "Tub" and the handle 65 has marked thereon at 74 an arrow pointing away from its center.

The operation of the device is as follows:

The handle 65 of the valve spindle 60 of the diverting valve 23 is set as shown in Fig. 1 with the handle and its arrow pointing downwardly toward the tub, over the designation "Tub" on the escutcheon 69. In this position which is also illustrated in Fig. 5 the valve opening 43 affords communication between control chamber 39 and tub outlet chamber 41, while valve disc 62 tightly rests against seat 54 thereby shutting off shower outlet chamber 40. Hot and cold water valves 11 and 12 are then opened and the water supplied from pipes 16 and 17 admitted into housing 13 common to both valves, thence through water mixture pipe 19 into control chamber 39, whence it passes through valve opening 43 into the tub outlet chamber 41, and through tub pipe 24 and water spout 27 into the tub 28. By regulating valves 11 and 12 a hotter or colder mixture of water is obtained in the customary manner.

Should I now wish to employ the shower, I simply give the valve spindle 60 an one-half turn around, the pitch of its thread being selected accordingly, so as to bring its handle 65 pointing upwardly toward the shower over the marking "Shower" on escutcheon 69. In this position which is shown in Fig. 4, the valve disc 62 shuts off tub outlet chamber 41 and exposes the open inner tubular end of bonnet 47 within the housing 33 of the valve 23, thereby diverting the water from the water mixture pipe 19 through apertures 58 into the shower outlet chamber 40 and thence through shower pipe 29 out through the shower head 32.

It will clearly be seen that through manipulation of the valves 11 and 12, as explained, the proper mixture of the water can be ascertanied at the spout outlet to the tub, and as soon as satisfactorily determined, can be diverted to the shower, without the user being injured by water of either too hot or too cold a temperature. It will also be noted that thus a splashing of the water about the tub or the bath room, incidental to testing the temperature of the water from the shower, preliminarily to using the shower, is entirely eliminated.

Furthermore, the possibility of leaving the hot and cold water supply control valves open when finished with using the fixtures is entirely eliminated, because water will issue either from the shower head or from the spout leading to the tub indicating that these valves are open. This is of particular advantage over the usual mixing valve arrangement or independent valves for the shower and the tub, where these independent valves or the mixing valve may be shut off and the supply control valves left open without any visible indication that they are open, which often results in the hot water backing into the cold water pipes, or vice versa, according to whatever pressure is the highest, unless special check valves are provided to prevent this.

It is particularly pointed out that only 3 distinct valves are needed with bath fixtures embodying the principles of my invention, namely, two primary valves i. e. 1 hot water supply control valve and 1 cold water supply control valve, and one secondary valve, i. e. a valve diverting the water from the primary valves to either the shower or the tub. This simplifies considerably bath fixture constructions, because I eliminate 1 valve for the control of the shower and tub, where formerly 2 independent valves were used, of which one usually was of the expensive mixing type, and furthermore, I entirely eliminate the possibility of leaving the supply control valves open, as stated before.

While I have shown a preferred embodiment of the construction of the secondary or diverting valve, it is understood that I do not wish to limit myself to the particular construction disclosed, but any valve structure, of either the reciprocating or rotary type, diverting water from one inlet to either of two outlets may be employed. Also, I may reverse the location of the outlet chambers or arrange them in any other desired relation to each other. Furthermore, while I have illustrated the valve used in connection with an overhead shower any other form of water outlet may be used, such as the needle point outlet, mounted at right angles to the wall, for instance. It is therefore obvious that various changes of form, proportion, minor details and combination of parts may be resorted to without departing or sacrificing any of the advantages of the invention, as defined in the appended claims.

What I claim as new, is:

1. In a diverting valve for the purpose specified, a housing having an inlet chamber, an outlet chamber to a shower, and an outlet chamber to a tub, the said chambers being connected with each other by concentric passages, the wall separating the inlet chamber from the said outlet chamber to a shower having an annular recess at its outlet chamber side, and a resilient gasket within the said recess, a bonnet extending into the said outlet chamber to a shower, having an annular shoulder within the said outlet chamber to a shower adapted to compress the said gasket to cause a fluid tight joint between the said bonnet and the said wall, a valve spindle adapted to be reciprocated within the said bonnet and extending into the said inlet chamber, and a valve disc secured to the end of the spindle, adapted to close the passage between the said inlet chamber and the said outlet chamber to a tub, and also adapted to be moved to seat against the inwardly extending end of the said bonnet to close the passage between the inlet chamber and the said outlet chamber to a shower and simultaneously open the passage between the inlet chamber and the said outlet chamber to a tub.

2. In a diverting valve for the purpose specified, a housing having an inlet chamber, an outlet chamber to a shower, and an outlet chamber to a tub, the said chambers being connected with each other by concentric passages, the wall separating the inlet chamber from the said outlet chamber to a shower having an annular recess at its outlet chamber side around the passage through the said wall, and a resilient gasket within the said recess, a bonnet in central alignment with the said concentric passages extending through the said outlet chamber to a shower, having a tubular end fitted within the said wall, carrying a valve seat projecting into the said inlet chamber and an annular shoulder within the said outlet chamber to a shower adapted to compress the said gasket to cause a fluid tight joint between the said bonnet and the said wall, a valve spindle adapted to be reciprocated within the said bonnet and extending into the said inlet chamber, and a two-faced valve disc secured to the end of the spindle within the inlet chamber, adapted to seat with one face against the valve seat at the tubular end of the said bonnet and being also adapted to be moved to a position to close with its other face the passage between the said inlet chamber and the said outlet chamber to a tub.

3. In a diverting valve for the purpose specified, a housing having an inlet chamber, an outlet chamber to a shower, and an outlet chamber to a tub, the said chambers being connected with each other by concentric passages, the wall separating the inlet chamber from the said outlet chamber to a shower having an annular recess at its outlet chamber side around the passage through the said wall, and a resilient gasket within the said recess, a bonnet in central alignment with the said concentric passages extending through the said outlet chamber to a shower, having a tubular end, removably fitted within the said wall adjacent the said recess, carrying a valve seat projecting into the said inlet chamber and an annular shoulder within the said outlet chamber to a shower adapted to compress the said gasket to cause a fluid tight joint between the said bonnet and the said wall, a valve spindle adapted to be reciprocated within the said bonnet and extending into the said inlet chamber, and a two-faced valve disc secured to the end of the spindle within the inlet chamber, adapted to seat with one face against the valve seat at the tubular end of the said bonnet and being also adapted to be moved to a position to close with its other face the passage between the said inlet chamber and the said outlet chamber to a tub, the said valve disc and the said spindle being adapted to be removed from the housing together with the said bonnet.

4. In a diverting valve for the purpose specified, a housing having an inlet chamber, an outlet chamber to a shower, and an outlet chamber to a tub, the said chambers being connected with each other by concentric passages, the wall separating the inlet chamber from the said outlet chamber to a shower having an annular recess at its outlet chamber side around the passage through the said wall, and a resilient gasket within the said recess, a bonnet in central alignment with the said concentric passages extending through the said outlet chamber to a shower, having a tubular end, removably fitted within the said wall adjacent the said recess, carrying a valve seat projecting into the said inlet chamber and an annular shoulder within the said outlet chamber to a shower, adapted to compress the said gasket to cause a fluid tight joint between the said bonnet and the said wall, a valve spindle adapted to be reciprocated within the said bonnet and extending into the said inlet chamber, and a two-faced valve disc secured to the end of the spindle within the inlet chamber, adapted to seat with one face against the valve seat at the tubular end of the said bonnet and being also adapted to be moved to a position to close with its other face the passage between the said inlet chamber and the said outlet chamber to a tub, the said valve disc and the said spindle being adapted to be removed from the housing together with the bonnet, the said bonnet projecting externally of the said housing and having an annular recess around its said externally projecting portion, adjacent the said housing, a resilient gasket within the said latter-named recess, and adjustable means, engaging the said projecting portion, adapted to compress the said latter-named gasket to make a fluid tight joint between the said bonnet and the said housing.

In testimony whereof I have hereunto set my hand and seal.

SAMUEL GADE. [L. S.]